United States Patent [19]

Shrier et al.

[11] Patent Number: 5,248,517
[45] Date of Patent: Sep. 28, 1993

[54] PAINTABLE/COATABLE OVERVOLTAGE PROTECTION MATERIAL AND DEVICES MADE THEREFROM

[75] Inventors: Karen P. Shrier, Half Moon Bay; Richard K. Childers, Foster City; John H. Bunch, Menlo Park, all of Calif.

[73] Assignee: Electromer Corporation, Palo Alto, Calif.

[21] Appl. No.: 794,993

[22] Filed: Nov. 15, 1991

[51] Int. Cl.$^5$ .................. B05D 5/12; B05D 3/02; H01B 1/04; C08J 3/02
[52] U.S. Cl. ................................. 427/58; 427/123; 427/383.1; 427/388.1; 252/502; 252/511; 252/512; 252/516; 252/518; 106/236
[58] Field of Search ............... 427/58, 123, 383.1, 427/388.1; 252/502, 511, 512, 516, 518; 106/236

[56] References Cited

U.S. PATENT DOCUMENTS 4,331,948  5/1982  Malinaric et al. ............ 252/516

*Primary Examiner*—Anthony McFarlane
*Assistant Examiner*—Nhat D. Phan
*Attorney, Agent, or Firm*—Flehr, Hohbach, Test, Albritton & Herbert

[57] ABSTRACT

A nonlinear transient overvoltage protection coating material and process for coating are disclosed herein. The viscous paintable material is for overvoltage protection and/or for use in detecting pressure externally applied to the material. A binder substance is combined with conductive particles and a solvent.

13 Claims, 4 Drawing Sheets

FIG.−1

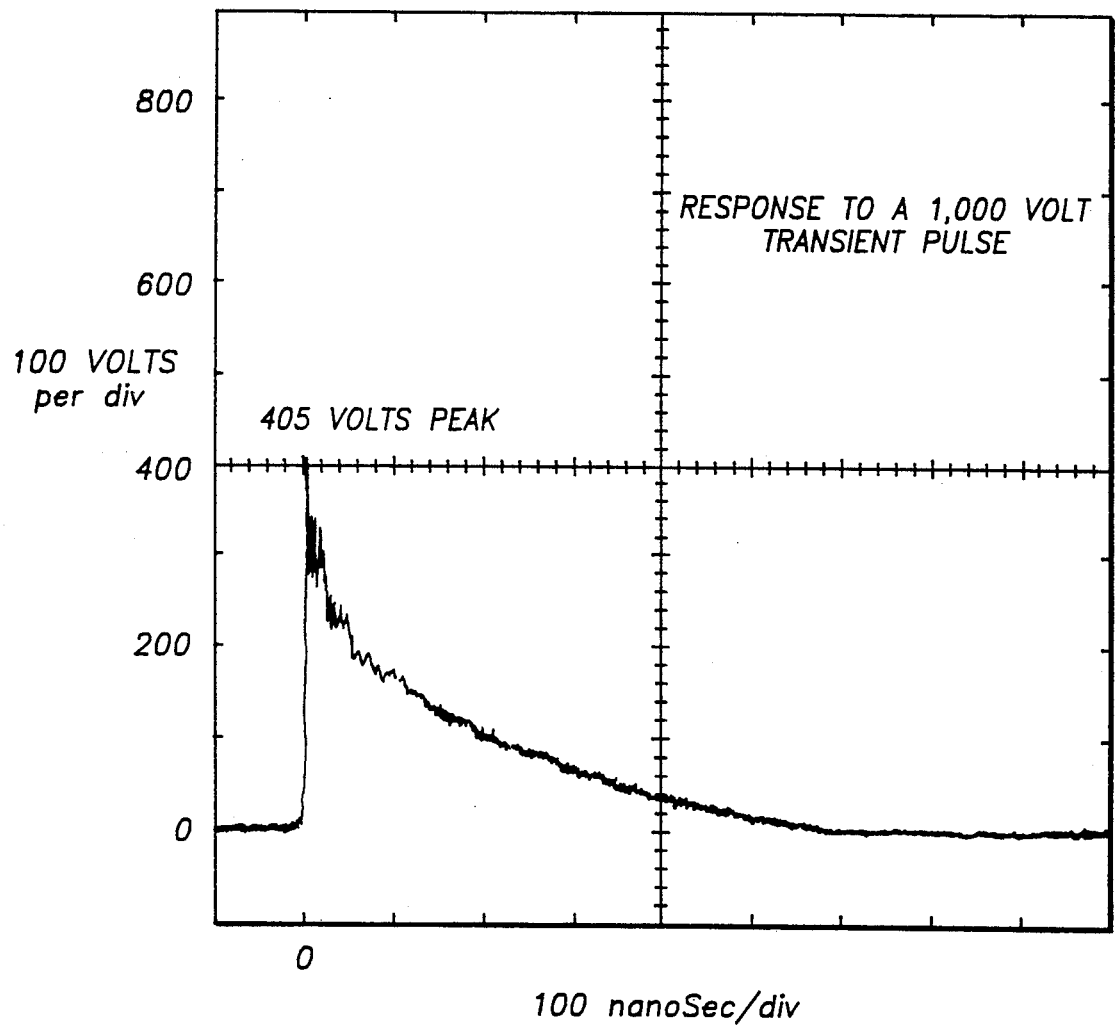
FIG.—4

5,248,517

PAINTABLE/COATABLE OVERVOLTAGE PROTECTION MATERIAL AND DEVICES MADE THEREFROM

FIELD OF THE INVENTION

This invention relates generally to transient overvoltage protection material. More particularly, it relates to a paintable transient overvoltage protection material.

BACKGROUND OF THE INVENTION

All types of conductors are subject to transient voltages which potentially disable unprotected electronic and electrical equipment. Transient incoming voltages can result from lightning, electromagnetic pulses, electrostatic discharges, ground loop induced transient or inductive power surges.

More particularly, transients must be eliminated from electrical connectors commonly used in radar, avionics, sonar and broadcast. The need for adequate protection is especially acute for defense, law enforcement, fire protection, and other emergency equipment. used. These machined surfaces result in matte finishes. Alternatively, disk substrates could be precision blanked from flat precision cold-rolled aluminum-alloy sheet or other metal strip whose surface finish would replicate that of the work rolls used in the finishing pass of the rolling mill. For example, with work rolls that have been ground and polished to a mirror-bright finish, a metal strip with a mirror-bright surface finish would result. Typically, the aluminum-alloy disk is coated with an electroless-deposited nickel-phosphorus alloy, which is nonmagnetic. However, in order for this plating to adhere properly to the matte surface of an aluminum-alloy disk, a zincate solution is used to dissolve the surface aluminum oxides, hydroxyoxides, and hydrous oxides, and to provide a zinc metal monolayer by replacement reaction. The surface of the electroless-deposited-nickel-phosphorus-alloy-coated aluminum-alloy disk must be lapped and polished prior to the subsequent plating or sputter-deposition of the magnetic layer. Therefore, the fabrication must engage in the laborious lapping and polishing of the disk substrate. This lapping and polishing step is expensive and adds substantial costs to the final disk product. Furthermore, it is extremely difficult to obtain flaw-free electroless-deposited nickel-phosphorus-alloy coatings. Nodules, pits, and bumps occur in these coatings and such defects cause recording errors.

In addition, the electroless-deposited nickel-phosphorus alloy is very prone upon heating to recrystallization, where the nonmagnetic (actually, paramagnetic) nonequilibrium extremely microcrystalline supersaturated-solid-solution single phase of nickel and phosphorus separates into two equilibrium crystalline phases, namely, nickel, which is ferromagnetic, and nickel phosphide. The resulting ferromagnetism renders the media useless for the magnetic-recording application.

It is yet another object of the present invention to provide a process for coating a surface with an overvoltage protection viscous coating material.

Another object of the invention is to provide an electrically non-linear thin membrane or tape.

It is a related object of the present invention to provide a material wherein the clamp voltage changes when pressure is applied to the material.

The foregoing and other objects of the invention are achieved by a method of combining an transient overvoltage protection material, for example, a binder substance with conductive particles, each in amounts sufficient so that the combination of the binder substance and the conductive particles exhibit transient overvoltage protection material properties and a solvent. Furthermore, the above objects are also achieved by a process for coating a surface with such viscous coating material.

BRIEF DESCRIPTION OF THE DRAWINGS

FIG. 4 shows a graph of the clamping response of the invention after the compressive force as shown in FIG. 3 has been released.

DETAILED DESCRIPTION OF THE INVENTION

Figure 1:
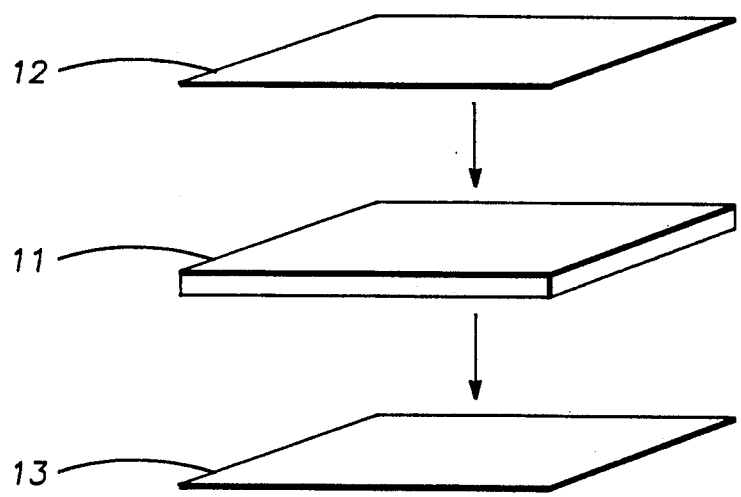
FIG. 1 is an exploded perspective view of the present invention placed between two conductive members.

Turning now to the drawings, wherein like components are designated by like reference numbers in the various figures, attention is initially drawn to FIG. 1. The present invention placed between two conductive members is depicted therein. Paintable transient overvoltage protection material 11 is between upper electrode 12 and lower electrode 13. The electrodes 12 and 13 can be of any conducting material, such as nickel foil.

Paintable overvoltage protection materials having quantum mechanical tunneling properties or foldback switching properties, generally possesses the following ratio of parts:

| Insulating binder | 70 to 88% |
|---|---|
| Conducting filler | 12 to 30% |

Specifically, a paintable overvoltage protection material having such quantum mechanical tunnelling characteristics may be prepared in the following way:

| Silicon Rubber (general purpose) | 71 grams |
|---|---|
| Nickel Powder (1-5 micron) | 128 grams |
| Silicon Carbide (1-5 micron) | 15 grams |
| Peroxide Cure Agent | 3 grams | are combined with a solvent, such as, naphtha, xylene, acetone or MEK.

Specifically, a paintable overvoltage protection material having such foldback switching characteristics may be prepared in the following way:

| Silicon Rubber (general purpose) | 71 grams |
|---|---|
| Nickel Powder (1-5 micron) | 98 grams |
| Silicon Carbide (1-5 micron) | 24 grams |
| Peroxide Cure Agent | 3 grams | are combined with a solvent, such as, naphtha, xylene, acetone or MEK.

Transient overvoltage protection material 11, being a quantum mechanical tunneling material, such herein incorporated by reference and fully disclosed in U.S. Pat. No. 4,977,357, issued to Karen P. Shrier on Dec. 11, 1990. Furthermore, overvoltage protection material 11 being a foldback switching material, also herein incorporated by reference and fully disclosed in U.S. patent application, Ser. No. 07/728,605, presented for examination by Karen P. Shrier and Richard K. Childers, filed Jul. 11, 1991. Furthermore, other types of overvoltage protection materials can be utilized for the same purpose. This disclosure is not intended to limit the breadth of the overvoltage protection material element of the present invention.

To prepare transient overvoltage protection material 11 of either the quantum mechanical tunneling type or the foldback switching type, the above listed ingredients in proper proportions are blended on a two-roll rubber mill using standard techniques. The blended material is then placed in a suitable container and a solvent such as naphtha, is added. In one embodiment, approximately 200 grams of the blended above listed ingredients is combined with naphtha until the solution is the desired viscosity. As the solvent is added, the solution is stirred and the overvoltage protection material is dissolved. A paint-like consistency is achieved.

The material can be coated onto a substrate by any suitable technique, including but not limited to silk screening, thick film printing, spray or brush painting, spreading, pouring or casting. The ability to coat a substrate with an electrically non-linear material allows the conformal coating of large areas and intricate surfaces for overvoltage protection. It further allows utilizing coating as a method of manufacture of overvoltage protection devices. For example, in an electronic circuit, coating material may be applied onto one or more electrodes. Furthermore, the techniques disclosed herein may be applied to the manufacture of surface mount devices.

The coating material may be applied to any substrate, flexible or otherwise. For example, the coating material may be applied to form an electrically non-linear thin membrane or tape providing overvoltage protection. Also, the coating material may be used in the manufacture of any type of printed circuit board, including both rigid and flexible printed circuit boards. The applied coating material may form an integral layer or section of a multilayer board. By directly printing the coating material onto a surface, the coating material functions as a discreet device or as part of associated circuitry. Moreover, arrays of such configurations may be utilized. Directly depositing the coating material onto a substrate is analogous to printing a diode, Transzorb, varistor or gas discharge tube onto a substrate.

Returning to FIG. 1, coating material 11 between upper electrode 12 and lower electrode 13 provides an overvoltage protection device. Preparation of a one inch square device like that shown includes smoothing the material onto a nickel foil electrode with a spatula. A second nickel foil electrode of the same size is placed on top of the material to form a foil-composite-foil sandwich device. The device is then cured in an oven for about 45 minutes at 120° C. The thickness of the cured material can be in the range of 0.002 inches to 0.012 inches or greater depending on the amount of coating material originally applied.

Figure 2:
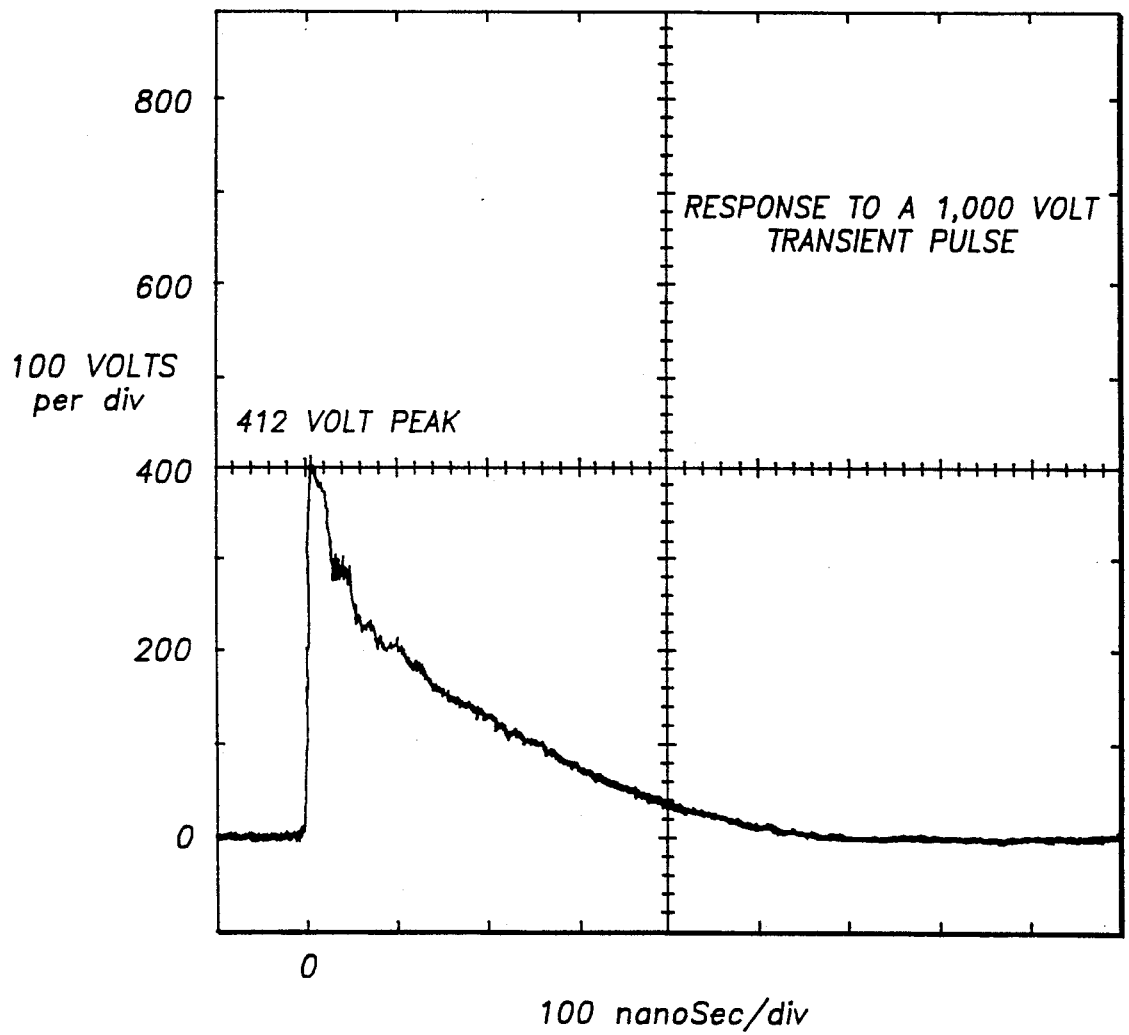
FIG. 2 shows a graph of the clamping response of the present invention.

After curing, the clamping voltage of the device as shown in FIG. 1 was tested using a Schaffner NSG 225 pulser set for a 1000 volt pulse. The clamping response of the device to this pulse is shown in FIG. 2 as clamping the transient pulse to 412 volts. The results shown in FIG. 2 are very similar to those obtained for the same overvoltage protection material processed by traditional techniques.

Figure 3:
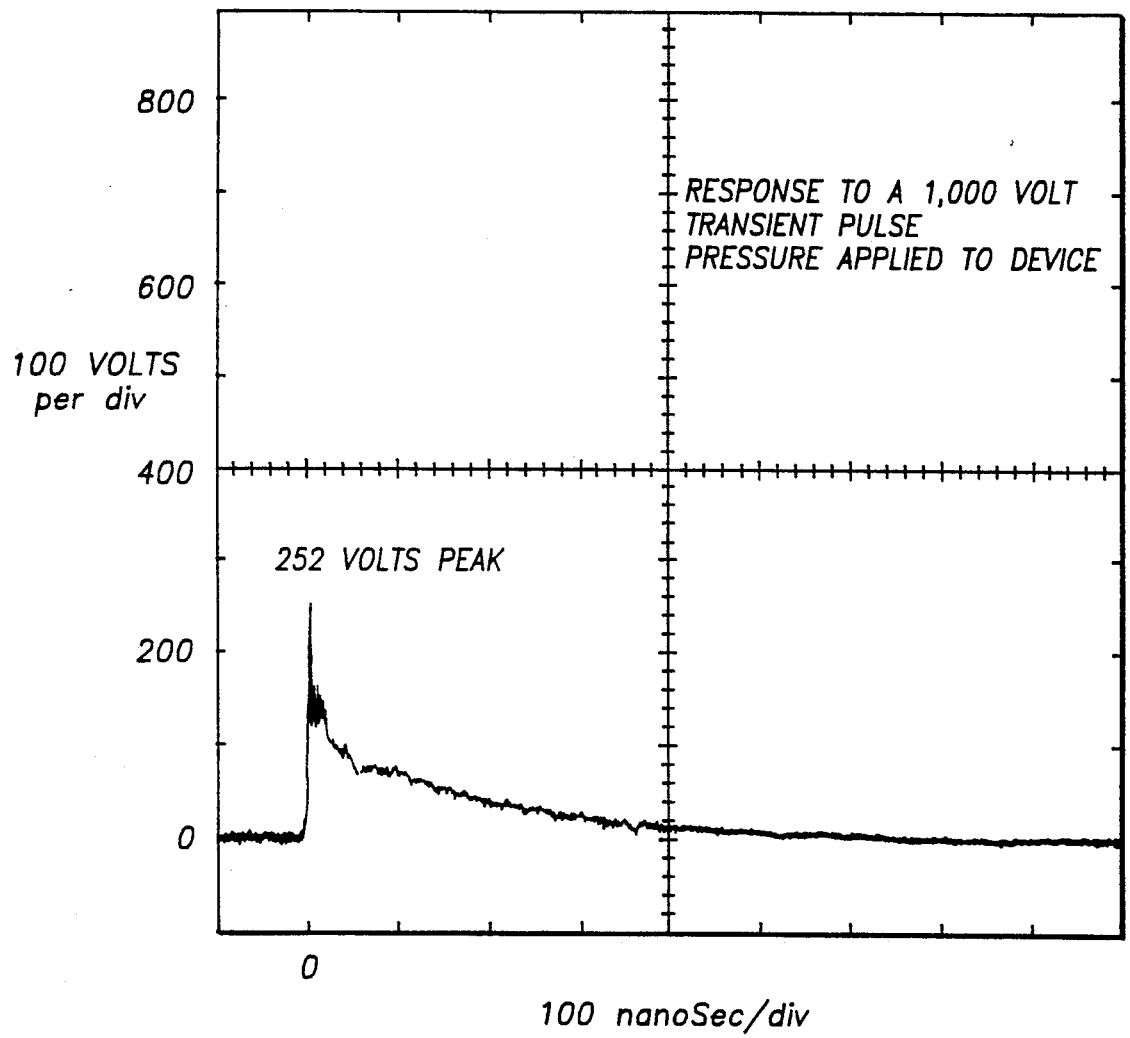
FIG. 3 shows a graph of the clamping response when the present invention is subject to compressive force.

When the device as shown in FIG. 1 is "squeezed," that is, when pressure in applied, the response curve is substantially altered. FIG. 3 shows a graph of the clamping response when the present invention is subject to compressive force. The clamping voltage is reduced significantly to 252 volts and the shape of the current-voltage curve is substantially altered.

By releasing the device from the pressure, the performance of the device returns substantially to that of FIG. 2. FIG. 4 shows a graph of the clamping response of 405 volts after the compressive force of FIG. 3 has been released.

Accordingly, the present invention includes an electrically non-linear material which provides overvoltage protection and is also sensitive to pressure changes. Because non-linear properties of the coating material change with applied pressure, the present invention may be utilized in the manufacture of pressure sensors including circuitry for monitoring the change in electrical properties as external pressure is varied.

Pressure sensors of varying kinds can be manufactured in accordance with the present invention. For example, pressure sensors can be made from thin membranes or tape of the coating material. Moreover, the coating material may be applied to a flexible or inflexible substrate and used as a pressure sensor.

The viscosity of the coating material can be adjusted to match the requirements of the specific application or the requirements of the application tools such as a paint brush, spray unit or other such coating device. Solvent may be added to transient overvoltage protection material such as, the quantum mechanical tunneling material or the foldback switching material as described above, such that the viscosity of the coating material is between 1 centipoise and at least a few thousand centipoise.

Thus, it is apparent that there has been provided, in accordance with the present invention, a method for providing an overvoltage protection viscous coating material and a process for coating an article with the same. Moreover, the object of providing an overvoltage protection viscous coating material which exhibits quantum mechanical tunneling properties or foldback switching properties has been met. Also met is the object of the present invention to provide an electrically non-linear thin membrane or tape.

Furthermore, the related object of the present invention to provide a material wherein the clamp voltage changes when pressure is applied to the material has been achieved. Accordingly, the present invention fully satisfies the objects, aims and advantages set forth above. While the invention has been described in conjunction with specific embodiments thereof, it is evident that many alternatives, modifications, and variations will be apparent to those skilled in the art in light of the foregoing description.

We claim:

1. A process for coating a surface of an article with an overvoltage protection viscous coating material, comprising:

dissolving a composition which exhibits transient overvoltage protection properties, in a solvent liquid to form a viscous coating solution;

coating the surface of an article with said viscous coating solution; and allowing said solvent to evaporate from said solution.

2. A process as recited in claim 1 wherein said surface is a conductive substrate.

3. A process as recited in claim 1 wherein said surface is a flexible membrane.

4. A method of providing a transient overvoltage protection viscous coating material for coating electrically conductive articles, such method comprising the step of preparing a solution by combining:
   a binder substance with conductive particles, each in amounts sufficient so that the combination of said binder substance and said conductive particles exhibits transient overvoltage protection properties; and
   a solvent.

5. A method as recited in claim 4 wherein in the combination of said binder substance and said conductive particles, said binder substance occupies between 70% and 88% by volume and said conductive particles occupies between 12% and 30% by volume.

6. A process as recited in claim 4 wherein said binder substance in combination with said conductive particles is a quantum mechanical tunneling material formed of a matrix wherein said conductive particles are homogeneously distributed, said particles being in the range of 10 microns to two hundred microns and spaced in the range of 25 angstroms to 350 angstroms to provide said quantum mechanical tunneling therebetween; and said binder selected to provide quantum mechanical tunneling media and an amount of resistance between said conductive particles.

7. A process as recited in claim 4 wherein said binder substance in combination with said conductive particles is a foldback switching material formed of a matrix wherein said conductive particles are homogeneously distributed, said particles being in the range of 10 microns to two hundred microns and spaced approximately at least 100 angstroms apart to provide said foldback switching mechanism therebetween; and a binder selected to provide a foldback media and an amount of resistance between said conductive particles.

8. A method as recited in claim 4 wherein said binder substance is selected from the group consisting of elastomers, thermosets, copolymers and thermoplastics.

9. A method as recited in claim 4 wherein said conductive particles are selected from the group consisting of metals, metal alloys, conductive carbides, conductive nitrides, conductive borides, and metal coated glass spheres.

10. A method as recited in claim 4 wherein said solvent is selected from the group consisting of naphtha, xylene, acetone and methyl ethyl ketone.

11. A method as recited in claim 4 wherein the viscosity of said viscous material is between 1 centipoise and at least eight thousand centipoise.

12. A method as recited in claim 4 wherein said binder substance is selected from the group consisting of polyolefins, polyurethanes and thermoplastic elastomers.

13. A method as recited in claim 4 wherein said binder substance is halogenated polyolefin.

* * * * *